United States Patent [19] [11] 3,910,861
Wolvers et al. [45] Oct. 7, 1975

[54] PROCESS FOR THE PREPARATION OF GRANULAR OR POWDERY POLYAMIDE

[75] Inventors: Wilhelmus P. Wolvers, Sittard; Pierre J. Franssen, Stein; Jean M. M. Warnier, Urmond, all of Netherlands

[73] Assignee: Stamicarbon, N.V., Geleen, Netherlands

[22] Filed: Aug. 30, 1973

[21] Appl. No.: 393,230

Related U.S. Application Data

[63] Continuation of Ser. No. 203,434, Nov. 30, 1971, abandoned.

[30] Foreign Application Priority Data
Dec. 5, 1970 Netherlands.................. 7017791
May 15, 1971 Netherlands.................. 7106704

[52] U.S. Cl. ........................ 260/78 L; 260/37 N
[51] Int. Cl.$^2$............................ C08G 69/18
[58] Field of Search .................. 260/78 L, 37 N

[56] References Cited
UNITED STATES PATENTS

| | | | |
|---|---|---|---|
| 3,037,001 | 5/1962 | Becke et al. | 260/78 L |
| 3,141,006 | 7/1964 | Kohan | 260/78 L |
| 3,155,637 | 11/1964 | Reichold | 260/78 L |
| 3,309,343 | 3/1967 | Darnell et al. | 260/78 L |
| 3,325,455 | 6/1967 | Warner | 260/78 L |
| 3,451,976 | 6/1969 | Lucas | 260/78 L |
| 3,484,415 | 12/1969 | Sahler | 260/78 L |
| 3,488,326 | 1/1970 | Van Beveren et al. | 260/78 L |
| 3,562,221 | 2/1971 | Steinhofer et al. | 260/78 L |
| 3,639,359 | 2/1972 | Garritsen et al. | 260/78 L |
| 3,658,765 | 4/1972 | Veermans et al. | 260/78 L |

*Primary Examiner*—Lucille M. Phynes
*Attorney, Agent, or Firm*—Cushman, Darby & Cushman

[57] ABSTRACT

A one step process for the preparation of granular or powdery polyamides having a novel combination of high specific density and relative viscosity, along with narrow particle size distribution and low water extractable content, but with a wide molecular weight distribution, is described wherein the polymerization process is carried out in an inert solvent, in which the lactam monomers are substantially soluble but polyamide product is substantially insoluble, and at a temperature below the melting point of the polyamide to be formed, and wherein the essential promoter employed is bis-ϵ-caprolactimether.

10 Claims, No Drawings

PROCESS FOR THE PREPARATION OF GRANULAR OR POWDERY POLYAMIDE

This application is a continuation of our earlier copending application, Ser. No. 203,434 filed Nov. 30, 1971 and now abandoned.

The invention relates to the process for the preparation of granular or powdery polyamide by polymerization, using an anionic catalyst and a promoter of a lactam or of a mixture of lactams in an inert solvent at a temperature below the melting point of the polyamide to be formed.

The resulting granular polyamide can easily be stored and shipped and is readily processed to fibres, film, threads, coating layers and shaped objects. The above-mentioned process represents the only method for one-step preparation of granular or powdery polyamide. By hydrolytic polymerization a polyamide melt is obtained, whilst anionic polymerization in the mass yields a melt or a solid polyamide block, dependent on the polymerization temperature.

In practice, however, it has been difficult to achieve good and reproducible results by this anionic polymerization in a solvent at a temperature below the melting point of the polyamide to be formed. In tests, using different catalysts, promoters and solvents, it has been difficult to control the grain size, the degree of polymerization and the polymerization rate, the yield has been small and the resulting polyamide in many cases forms lumps or settles on the reactor wall and the stirrer and can hardly be separated from the solvent.

In order to overcome these difficulties it has been variously proposed that the catalyst and/or the promoter be added to the dissolved monomers in small portions at different points of time (see U.S. Pat. No. 3,484,415), or for the polymerization to be carried out in the presence of polymeric dispersing agents of high molecular weight (see U.S. Pat. No. 3,298,977), or for a distributing agent to be used having a specific gravity which lies just between the specific gravities of the lactam-monomer and the polyamide to be formed (see U.S. Pat. No. 3,451,976).

According to the present invention it is now possible, without exercising such special process control measures, to prepare superior powdery or granular polyamide by an efficient polymerization of a lactam or of a mixture of lactams using an anionic catalyst and a promotor in an inert solvent at a temperature below the melting point of the polyamide to be formed, provided there is used as the promoter the compound bis-ε-caprolactimether.

In the process according to the invention a fine-grained polyamide is formed in satisfactory yields. The product has a narrow grain-size distribution and can very easily be separated from the solvent.

The specific density of the resulting polyamide is higher than any so far found in polyamides (approx. 1.17) and the percentage of water-extractable material is low, in most cases smaller than 1 %. The relative viscosity of these polyamides can lie between the usual values of 2.0 and 8.0 for polyamides, corresponding to weight-average molecular weights of between 20,000 and 100,000, but also products of much higher molecular weight and a relative viscosity of 20 can be prepared.

In this connection it is striking that the molecular weight distribution is rather wide, the ratio between the weight-average molecular weight and the number-average molecular weight being large, contrary to the narrow molecular weight distribution generally found in polyamides prepared by anionic polymerization with the usual, other promoters. Presumably, the polymer contains a relatively large percentage of polyamide of low molecular weight, but which cannot be extracted by means of water. As a result of this circumstance, the polyamide obtained according to the invention can readily be spun and extruded, even though the relative viscosity is high. For instance, the polyamide having a relative viscosity of 4.0 can still be easily spun, whereas known polyamides having a relative viscosity of 3.0 prepared by hydrolytic polymerization can be spun only with great difficulty. Another consequence is that the polyamide contains a great many basic terminal groups in comparison with polyamides having the same relative viscosity which are prepared by another method, so that the polyamide obtained according to the invention is more readily dyeable.

The mechanical properties of the polyamides prepared according to the invention, and of the objects manufactured therefrom, are also good. A very favorable aspect is that the notch impact strength is large along with the presence of high rigidity characteristics (expressed as E-modulus), whereas in the case of other polyamides an increase in impact strength is as a rule obtained at the expense of decreased rigidity. The creep of extruded products is also low, whilst both the bending strength and the yield value are high.

It is to be understood that where bis-ε-caprolactimether is mentioned herein, the two tautomeric forms of this compound are meant. This promoter may be employed in portions of about 0.1–5.0 mol-% with respect to the lactam, or the mixture of lactams, to be polymerized. Preferably, however, quantities of about 0.5–2.0 mol-% are employed because very good results are generally achieved within this range. A further, special, advantage is that in practicing the process according to this invention one is substantially free in the choice of the molar ratio between catalyst and promoter.

When using other, known promoters this ratio should be maintained at a level of about 1 or larger, since at a lower ratio the polymerization process is impeded. When, however, bis-ε-caprolactimether is used as promoter in accordance with the present invention the said ratio may be either larger and smaller than 1 without so interfering with the polymerization. Preferably a molar catalyst/promoter ratio of between 4:1 and 1:4 should be employed.

Known compounds of the class of metal-lactams may be used as the catalyst, as well as substances reacting with lactam with the formation of a lactam-anion. These are the usual catalyst employed in the process. Examples include alkali metal lactams, alkali metals, alkaline earth-oxides, -hydroxides, -alkoxides and -hydrides, and Grignard compounds. The catalyst is usually present in a quantity of about 0.1–5.0 mol-% based on the lactam or lactam mixture to be polymerized. In most cases good results are achieved using 0.5–2.0 mol-% of catalyst. The catalyst may be added directly to a solution of the lactam, or of the lactam mixture, or the catalyst may also be prereacted with an amount of melted lactam, with removal of the resulting volatile by-products, whereupon the resulting melt containing lactam-anions is added to the solvent.

The polymerization reaction is carried out with adequate stirring in order to keep the reactants substantially homogeneously mixed, but the stirring speed is not particularly critical in the process according to the invention. As a general rule, stirring is adequately carried out at a rate of about 200–800 revolutions per minute.

In order for a reasonable polymerization rate to be obtained, the polymerization temperature should be below the melting point of the polyamide to be formed, while, preferably in excess of about 100°C. Preference is given to a temperature of between about 125° and 170°C. In this temperature range the polymerization reaction proceeds rapidly, with simultaneous crystallization and growth on the polyamide particles formed at the beginning of the polymerization.

As the polymerization medium, common inert solvents and mixtures of solvents may be employed, in which the lactam or the mixture of lactams is soluble at the polymerization temperature and in which the formed polyamide is either insoluble or only slightly soluble under the polymerization conditions. A few examples of such solvents are toluene, xylenes, gasoline having a boiling range of 80°–140°C, tetramethylpentane, pentamethylheptane and tetralin, i.e. generally hydrocarbon solvents. Preferably solvents are chosen which have a boiling point which lies near or above the polymerization temperature, so that it is not necessary to work at a superatmospheric pressure. The pressure on the reaction is however of no importance to the progress of the polymerization reaction. In order to avoid disturbance of the polymerization and the formation of colored product, the reaction is preferably conducted with exclusion of water and oxygen.

As monomers, lactams and mixtures of lactams having at least 6 carbon atoms in the ring may be used. A few examples are caprolactam, oenantholactam, capryllactam, laurine lactam, substituted lactams and lactams having an ether- or thioetherbridge in the ring. The polymerization products of ε-caprolactam, and of lactam mixtures containing ε-caprolactam, possess particularly good mechanical properties.

After completion of the polymerization reaction the resulting powdery or granular polyamide can easily be separated from the solvent by known techniques, whereby, if necessary, the catalyst residues can be removed by washing the material with hot or cold water and/or with an alcohol, or by steaming it. The catalyst residues can be extremely easily removed with this invention because they are virtually exclusively located at the surface of the polyamide particles.

It is interesting to note the fact that while the use of bis-ε-caprolactimether as a promoter for the anionic polymerization of lactams in the mass has been known for a long time (see U.S. Pat. No. 3,141,006), along with a great many other promoters. The literature, however, contains no indication whatever which would lead one to predict that the very use of this particular bis-ε-caprolactimether for polymerization in an inert solvent could cause the solution polymerization to proceed with such high yields and with the formation of a polyamide of excellent granular quality, and the other desirable characteristics mentioned above.

Another aspect of the invention relates to a process for the preparation of filler-containing polyamide particles by the anionic polymerization of a lactam, in solution, in the presence of a particulate filler.

In processing filler-containing polyamides into, for instance, shaped objects or coating layers, a filled polyamide in the form of particles is most easily processed by means of such known techniques as injection-moulding, compression and whirl-sintering. While said filled particles can be obtained by processing a mass of polyamide, which has been produced by bulk-polymerization or by anionic polymerization in situ and in which a filler is distributed, into small particles, for instance by grating or grinding, such processes are cumbersome and moreover yield particles which are irregular in shape and size.

It has been proposed to prepare filler-containing, particle-shaped polyamides in one step by anionically polymerizing a lactam which is dissolved in a solvent, in which solvent a filler is distributed. However, in these processes one is still bound by the critical limits regarding the nature and the quantity of the solvent and the total filler surface present in the polymerization medium per gram of monomer and per liter of solvent.

These limits define a surface of between 0.1 and 16 $m^2$ per gram of monomer and a surface of between 0.02 and 7 $m^2$ per liter of solvent. Beyond these limits the polymerization reaction progresses rather poorly or a product of inferior quality is obtained. Therefore, the applicability of said known processes is limited.

It is further already known that the anionic polymerization of a lactam in solution can be carried out in the presence of dispersing agents that are not soluble in the reaction medium. The dispersing agent may then become enveloped in the polyamide formed, but this result is less desirable in many cases.

It has now been found that in the process according to the invention a filled polyamide in the form of particles can be prepared in one step, without being bound to critical limits as regards the nature and the quantity of the filler.

According to this aspect of the invention, in the anionic polymerization of one or more lactams that are dissolved in an inert solvent, with the application of bis-ε-caprolactimether as promoter and at a temperature below the melting point of the polyamide to be formed, one or more solid, particulate fillers, substantially inert to the polymerization process, are distributed in the reaction medium prior to or during the polymerization.

In this process, the filler particles are coated with a thin layer of polyamide, so that a particle-shaped, filled polyamide is formed.

Advantages of the process according to this aspect of the invention are, amongst others, that no special limits are set to the filler quantity, that no agglomeration of polyamide particles or polyamide growth on the reactor wall occurs, and that the filler need not have any dispersing effect at all. The adherence of the polyamide to the filler is good and the quality of the polyamide is excellent.

For the particulate filler, a very wide variety of substances may be applied, provided they are insoluble or only slightly soluble in the polymerization medium and do not interfere with the polymerization reaction. It is advisable that the filler be well dried prior to use, since water has a disturbing effect on the polymerization reaction. If necessary, the surface of the filler can be so treated, before addition to the polymerization medium so that otherwise disturbing groups are deactivated, removed or covered at its surface. If desired, an adhesion agent may also be added for further increasing the adhesion of the polyamide to the filler surface.

The solid particulate filler may be of organic or inorganic nature. A few examples of such applicable fillers are various powdery or fibrous metals, such as iron, copper, nickel, titanium, vanadium, chromium, cobalt, aluminum, boron; various minerals like quartz, feldspar, asbestos, mica, dolomite, graphite, talc, cristobalite; various oxides such as boron oxide, aluminum oxide, titanium oxides, magnesium oxide; and carbides, borides, silicates, carborundum, glass fibers, glass wool, carbon black, carbon fibers, and inorganic pigments; also thermo-set resins, such as phenol-formaldehyde resins; as well as thermoplastic synthetic materials, which do not significantly soften under the polymerization conditions, such as polyamides or polytetrafluoroethylene.

Very good results are achieved when glass fibers or carbon fibers are applied as a strengthening filler.

The filler particles may clearly differ in shape. However, preference is given to fillers of a uniform shape. Thus, the particles may be spherical, having a diameter of between 10 A and 1 cm and, preferably, the relative sizes being not excessively divergent. The particles may also be cylindrical or fibrous, conveniently having a diameter of between 0.5 microns and 100 microns and measuring between 5 microns and 2 cm in length. The length-to-diameter ratio may vary from about 20,000:1 to 5:1. If fibrous fillers are applied, preference is given to using fibers with a length-to-diameter ratio of between about 2,000:1 and 10:1. A polyamide powder that can be processed into shaped objects or coating layers, and having very good physical properties, is obtained by using both a fibrous and a powdery filler together. Examples are combinations of glass fiber, carbon fiber, asbestos fiber or metal fiber on the one hand with powdered carbon black, quartz, talc, granite, slate or graphite on the other. Of course, it is also possible for mixtures of similar fillers to be employed in the process according to the invention.

If, under the polymerization conditions the desired filler should show a tendency to soften, dissolve or degrade, it is advisable first to start the polymerization in the absence of the filler and, subsequently, to add the filler as soon as the polymerization mixture shows a slight turbidity.

The quantity of filler which can be added is essentially only limited by the quantity that can still be kept in a dispersed condition in the solvent. An upper limit for the quantity of filler to be added results from the demand that the amount of monomer present when the polymerization is started should at least suffice so that the total surface of the filler contained in the solution will be coated with a polyamide layer of sufficient thickness.

This upper limit lies approximately at a filler surface of about 20 m$^2$ per gram of monomer. There is no lower limit for the quantity of filler to be added. As described above, the polymerization even proceeds excellently in the complete absence of any kind of filler or dispersing agent, and with formation of a powdery polyamide.

The invention will now be further elucidated with the aid of the following illustrative examples concerning the preparation of polyamides according to the invention and the properties of the product so obtained. However, the invention is not limited to these modes of realization. For the sake of comparison, a few examples have been included relating to the polymerization using other promoters, notably acetyl caprolactam and benzoyl chloride, which allow reasonable results to be achieved on laboratory scale, although they fail in tests on a larger scale.

EXAMPLE I (Procedure for Table I; Laboratory Scale)

Dry caprolactam (200 g) is melted in a nitrogen atmosphere at a temperature of 90°C in a glass reactor of 1 liter. Subsequently, the catalyst (NaH) is added and, after the hydrogen development has discontinued, 0.4 l of dry pentamethylheptane is added, whereupon the solution is heated to the desired temperature and the promoter, bis-$\epsilon$-caprolactimether (B), is added. After some time the solution turns opaque due to the formation of small, solid polyamide particles. Microscopic examination at several points of time of particles removed from the solution will show that the particles are subject to regular growth, with formation of spherulites of even shape.

Upon completion of the polymerization the polyamide is filtered off, washed with water and dried.

The yield, determined as a percentage of the theoretical yield, the specific density, the percentage of material extractable with water (WOE) and the relative viscosity both before and after an extraction, are shown in the table. The relative viscosity is determined in solutions of 1.0 g of polymer in 100 ml of sulphuric acid.

In this way, powdery polyamides are prepared employing different catalyst/promoter ratios, polymerization times and polymerization temperatures. These results are summarized in Table 1, test runs 1 to 4 inclusive.

EXAMPLE II

For the sake of comparison, polyamides are prepared in the way described in Example I, but using acetyl caprolactam (A) and benzoyl chloride (C) as the promoters. These results are summarized in Table 1, test runs 5 and 6, and 7 and 8 respectively. It will be seen that in the polymerization reaction carried out using these promoters only the polyamides have a low relative viscosity and are formed in low yields, which yield decreases with added time. Also the grains are much more irregular in form and tend to form lumps.

Table 1

| test run | NaH mol.-% | prom. mol.-% | time h | temp. °C | yield % | WOE % | $\eta_{rel}$ before/after extraction | | specific density g/ml |
| --- | --- | --- | --- | --- | --- | --- | --- | --- | --- |
| 1 | 0.5 | 1.0 B | 7 | 145 | 64 | 0.6 | 3.79 | 3.93 | 1.174 |
| 2 | 0.5 | 0.5 B | 6 | 150 | 64 | <0.2 | — | 7.0 | 1.172 |
| 3 | 0.5 | 0.5 B | 18 | 145 | 92 | 0.6 | 7.90 | 7.5 | 1.176 |
| 4 | 0.5 | 0.5 B | 11 | 140 | 92 | 0.4 | 6.88 | 6.5 | 1.172 |
| 5 | 0.5 | 0.5 A | 1 | 160 | 39 | 1.4 | 2.68 | 2.74 | — |
| 6 | 0.5 | 0.5 A | 6 | 130 | 34 | 0.9 | 2.64 | 2.53 | — |

Table 1—Continued

| test run | NaH mol.-% | prom. mol.-% | time h | temp. °C | yield % | WOE % | $\eta_{rel}$ before/after extraction | | specific density g/ml |
|---|---|---|---|---|---|---|---|---|---|
| 7 | 1.5 | 1.0 C | 1 | 140 | 43 | 3.2 | 1.63 | 1.63 | — |
| 8 | 0.75 | 0.25 C | 4 | 140 | 20 | 1.2 | 3.19 | 2.78 | — |

B = bis-ε-caprolactimether
A = acetyl lactam
C = benzoyl chloride

EXAMPLE III (Table II; Semi-Technical Scale)

Polyamides are prepared in the way described in Example I, but now on semi-technical scale, starting from 30 kg of caprolactam in 60 l of pentamethylheptane, in a reactor having a content of 140 l and being provided with a turbine-stirrer. The stirring speed amounts to 500 rpm. The results are summarized in Table 2, test runs 9 to 14 inclusive.

EXAMPLE IV

For the sake of comparison, polyamides are prepared in the way described in Example III, using acetyl caprolactam and benzoyl chloride, respectively, as promoters. The results are summarized in Table 2, test runs 15 and 16 respectively.

Table 2

| test run | NaH mol.-% | prom. mol.-% | time h | temp. °C | yield % | WOE % | $\eta_{rel}$ before/after extraction | |
|---|---|---|---|---|---|---|---|---|
| 9 | 0.5 | 1.0 B | 10 | 142–145 | 87 | 0.4 | 4.63 | 4.46 |
| 10 | 0.5 | 0.5 B | 10.5 | 140–147 | 70 | 0.4 | 5.58 | 5.45 |
| 11 | 0.5 | 15 B | 2.5 | 140–170 | 70 | 0.4 | 5.43 | 5.53*[)] |
| 12 | 0.5 | 0.5 B | 17 | 135–145 | 83 | 0.8 | 6.87 | 6.40 |
| 13 | 1.5 | 0.5 B | 7 | 140 | 67 | 1.2 | 5.43 | 4.97 |
| 14 | 1.0 | 1.5 B | 9 | 135–145 | 92 | 0.1 | 3.63 | 3.81 |
| 15 | 0.5 | 0.5 A | 17 | 130 | 30 | 0.4 | 2.80 | 2.80 |
| 16 | 0.75 | 0.25 C | 5 | 145 | 14 | 0.6 | 2.37 | 2.29 |

*)In test 11 the temperature, unexpectedly, has risen high.
B = bis-ε-caprolactimether
A = acetyl caprolactam
C = benzoyl chloride

EXAMPLE V

The grain-size distribution of the polyamides prepared in the test runs 9 to 13 inclusive is determined by screening the material into different fractions. In table 3 the results are summarized under the test Nos. 9–13.

EXAMPLE VI

For the sake of comparison, also the grain-size distribution of the polyamides prepared in the tests 15 and 16 is determined. The results are summarized under the Nos. 15 and 16 in Table 3.

It appears that in the case of these polyamides prepared with the aid of acetyl caprolactam and benzoyl chloride, respectively, there is no possibility of a narrow grain-size distribution.

Table 3

| No. | <33μ % | 33–40μ % | 40–65μ % | 65–75μ % | 90–120μ % | |
|---|---|---|---|---|---|---|
| 9 | 9 | 48 | 38 | | | |
| 10 | 6 | 31 | 55 | | | |
| 11 | 2 | 4 | 1 | | 71 | 11 % >120μ |
| 12 | 3 | 1 | 57 | 37 | | |
| 13 | 1 | 50 | 45 | | | |
| 15 | 22 | 19 | 19 | 9 | 16 | 11 % >120μ |
| 16 | 0 | 2 | 2 | 10 | 4 | 76 % >180μ |

EXAMPLE VII

Of the polyamides prepared in the tests 9 to 13 inclusive small specimen plates are made by injection moulding. These plates are employed in determining the E-modulus, the breaking strength and the notch impact strength (Izod value), the last one both before and after conditioning. Also the relative viscosity of the polyamide is determined once again after the processing. The results are summarized in Table 4 under the Nos. 9–13.

EXAMPLE VIII

For the sake of comparison, a small specimen plate is made of the polyamide obtained in test 15, several properties of which are determined. The results are included in Table 4 under No. 15. All properties, with the exception of the E-modulus, appear to be clearly inferior to those of the polyamide prepared according to the invention.

Table 4

| No. | E-modulus kg/cm² | breaking strength kg/cm² | $\eta_{rel}$ | Izod kg/cm² before/after conditioning | |
|---|---|---|---|---|---|
| 9 | 9600 | 481 | 4.8 | 5.7 | n.b.*) |
| 10 | 9050 | 534 | 6.0 | 6.1 | n.b. |
| 11 | 9660 | 556 | 7.4 | 5.6 | n.b. |
| 12 | 9770 | 603 | 8.2 | 4.7 | n.b. |
| 13 | 8920 | 564 | 4.7 | 5.6 | n.b. |
| 15 | 11030 | 410 | 2.7 | 4.5 | 37 |

*)No breakage under test conditions

EXAMPLE IX

A mixture of 400 ml of pentamethyl heptane, 200 g of ε-caprolactam and 0.133 g of sodium hydride (0.5 mol-%) was heated to 120°C, with stirring. The solution formed was successively supplied with 2 g of powdery titanium dioxide (trade name Kronos AVF, average grain size 2 microns) and 1.91 g of bis-ε-caprolactimether (0.5 mol-%), whereupon the temperature was brought to 45°C. The reaction mixture was stirred for 12 hours at a temperature of 145°C, following which the polyamide powder formed was filtered off and washed with water. The yield amounted to 172 g of filled polyamide powder containing 1.1% by weight of titanium dioxide.

EXAMPLE X

In the way described in Example IX, a solution of 200 g of caprolactam in 400 ml of Decalin was polymerized with the aid of 1.0 mol-% of NaH and 1.0 mol-% of bis-ε-caprolactimether, in the presence of 20 g of ground glass fibers as filler. The polymerization was carried out at 150°C and lasted 8 hours. The yield amounted to 198 g of polyamide powder containing 1.0% by weight of glass fibers.

EXAMPLE XI

In the way described in Example IX, powdery polyamides filled with iron, and respectively with carbon black, ground glass wool, glass fibers and carbon fibers were prepared by polymerization of 200 g of caprolactam dissolved in 400 ml of pentamethyl heptane, with the aid of 1.0 mol-% of NaH and 1.0 mol-% of bis-ε-caprolactimether. The average dimensions of the filler particles were as follows:

| iron | diameter 10 microns |
| carbon black | diameter 20 millimicrons |
| glass fiber | diameter 10 microns, length 100 |
| carbon fiber | diameter 10 microns, length 500 |

The polymerization conditions and the results are summarized in Table 5.

In all cases all filler material was incorporated in the polyamide particles without causing growth on the reactor wall or agglomeration of the polyamide particles.

EXAMPLE XII

The polyamides obtained in Example X were processed into tests bars and small test plates and the physical properties of the materials were determined after the material had been conditioned by being kept, for 8 days, in a space with a relative humidity of 65% and a temperature of 70°C. The E-modulus and the flexural strength were determined by means of a flexural test according to ASTM Standard D-790. The breaking load, the elongation and the yield point were determined by means of a tensile test, the notch impact strength (Izod value) being determined according to ASTM Standard D-256-56. The results are summarized in Table 6.

Table 6

| filler % by w. | E-modulus kg/cm² | flexural strength kg/cm² | elongation % | yield point kg/cm² | breaking load | Izod kg/cm² |
| --- | --- | --- | --- | --- | --- | --- |
| 9.8 glass wool | 23,100 | 715 | 140 | 490 | 440 | 9.8 |
| 9.6 glass fibres | 26,100 | 754 | 155 | 496 | 494 | 10.8 |
| 27.0 glass fibres | 38,400 | 875 | 39 | 520 | 445 | 6.7 |
| 7.0 carbon fibres | 29,000 | 870 | 29 | 617 | — | 10.4 |
| 2.5 carbon black | 15,200 | 533 | 140 | 497 | 523 | 8.9 |
| 0.6 iron carbonyl | 13,300 | 477 | 213 | 492 | 330 | 31.8 |
| 0.5 iron | 13,400 | 463 | 180 | 480 | 518 | 27.8 |
| 0.9 iron | 14,000 | 460 | 217 | 492 | 614 | 25.3 |

EXAMPLE XIII

The physical properties of a few filled polyamides, prepared as in Example IX, in unconditioned state were determined with the aid of small test plates and test bars. For the sake of comparison, also the properties of a nonfilled polyamide, prepared in a way analogous to the process described in Example IX, were determined. The results are summarized in Table 7.

Table 7

| filler % by w. | E-modulus kg/cm² | flexural strength kg/cm² | elongation % | yield point kg/cm² | breaking load | Izod kg/cm² |
| --- | --- | --- | --- | --- | --- | --- |
| 27 glass fibres | 57,400 | 1448 | <2 | — | 859 | 4.4 |
| 7 carbon fibres | 47,300 | 1590 | <2 | — | 840 | 4.0 |
| 0.9 iron | 35,200 | 1250 | 60 | 741 | 577 | 6.0 |
| — | 33,200 | 1230 | 150 | 770 | 650 | 6.2 |

EXAMPLE XIV

In the way described in Example IX, a solution of 180 g of caprolactam in 400 ml of pentamethyl heptane was polymerized with the aid of 1.0 mol-% of NaH and 1.0

Table 5

| test run | filler | temp. °C | yield after extraction g | % by w. of filler in product | $\eta_{rel}$ |
| --- | --- | --- | --- | --- | --- |
| 1 | 20 g of glass wool, ground | 150 | 204 | 9.8 | — |
| 2 | 20 g of glass fibres, ground | 150 | 208 | 9.6 | — |
| 3 | 50 g of glass fibres, ground | 150 | 185 | 27.0 | — |
| 4 | 10 g of carbon fibres, ground | 150 | 142 | 7.0 | — |
| 5 | 5 g of carbon black | 160 | 194 | 2.5 | — |
| 6 | 1.0 g of iron carbonyl | 145 | 173 | 0.6 | 4.3 |
| 7 | 1.0 g of iron in emulsion*¹ | 145 | 187 | 0.5 | 5.3 |
| 8 | 5.0 g of iron in emulsion | 145 | 183 | 0.9 | 5.8 |
| 9 | 40 g of iron carbonyl | 160 | 200 | 20 | — |

*The emulsion consists of 75 g of finely dispersed iron, 30 g of caprolactam 60 g of pentamethyl heptane and 1.0 g of dispersing agent (trade name Gafac RE 160).

mol-% of bis-ε-caprolactimether, in the presence of 9 g of iron carbonyl and 9 g of ground glass fibers. After a polymerization time of 9 hours at 150°C, the yield amounted to 141 g of polyamide powder consisting of a mixture of iron-containing polyamide particles and polyamide particles containing glass fibers.

While the foregoing examples have illustrated the practice of the invention using caprolactam as the monomer, it will be understood that the procedures of those examples may also be employed with other lactam monomers having at least 6 carbon atoms in the lactam ring, and up to about 12 carbon atoms in said ring, including lactam monomers carrying any of those substituent groups which do not interfere with the polymerization reaction, such lactam monomers being already known in the art. Using such other lactam monomers, polyamide products will generally be obtained with comparable valuable characteristics as described herein above.

It will also be seen that this invention provides a novel polyamide product in a solid granular or powdery particulate form having a very high specific density of at least about 1.165. Further, the particle size distribution of this novel product will be quite narrow, with at least about 60 % of the particles falling within a size interval range of about 40 microns. Moreover, this novel product has, in combination with the above characteristics, a water extractable content of at most about 2 % by weight and exhibits a relative viscosity of at least between about 2.0 and 8.0, corresponding to a weight-averrage molecular weight of at least between about 20,000 and 100,000, with the ratio between the weight-average molecular weight and the number-average molecular weight being above about 3.5 and generally in the range of between about 4 to 5 (these ratios indicating a wide molecular weight distribution). This ratio generally is about 2 for polycaprolactam produced conventionally by anionic polymerization in the mass, and between 1 and 2 for polycaprolactam prepared by hydrolytical polymerization.

It will further be understood that in the practice of this invention, the bis-ε-caprolactimether is the essential promoter which must be used. However, of course, the benefits of the invention can also be realized in the presence of other promoters along with said bis-ε-caprolactimether. For instance, so long as at least between about 0.1 to 5.0 mol-% of bis-ε-caprolactimether is present (based on the quantity of lactam monomer present), there may be also present conventional promoters, known in the art, up to about 25 mol-% of the amount of the bis-ε-caprolactimether.

It will thus be seen that the practice of this invention is susceptible of variation from the specific procedures set forth in the foregoing examples, and its benefits may be realized by variations therefrom consistent with the foregoing teachings in this specification, as will be appreciated by those skilled in the art.

What is claimed is:

1. In a process for the preparation of polyamides in solid granular or powdery form by solution polymerization of at least one lactam monomer, using an anionic catalyst and a promoter, in an inert solvent in which the lactam monomer is substantially soluble and the polyamide product is substantially insoluble, by employing a temperature below the melting point of the polyamide to be formed, the improvement wherein the polyamide is prepared in one-step and bis-ε-caprolactimether is present as promoter for said polymerization.

2. The process according to claim 1 wherein at least an amount of between about 0.1 to 5.0 mol-% of bis-ε-caprolactimether, based on the quantity of lactam monomer, is present.

3. Process according to claim 2 wherein an amount from about 0.5 to 2.0 mol-% of bis-ε-caprolactimether, based on the quantity of lactam monomer, is present.

4. Process according to claim 1 wherein said polymerization reaction is carried out at a temperature from about 125°C to about 170°C.

5. Process according to claim 1 wherein at least one solid particulate filler is distributed in the reaction medium prior to or during the polymerization.

6. Process according to claim 5 wherein said filler comprises an essentially fibrous filler having length to diameter ratio of between about 2000:1 and 10:1.

7. Process according to claim 6 wherein a mixture of an essentially fibrous and an essentially spherical filler is applied.

8. Process according to claim 6 wherein said filler comprises glass fibers.

9. Process according to claim 6 wherein said filler comprises carbon fibers.

10. Process according to claim 1 wherein said lactam monomer comprises caprolactam.

* * * * *